United States Patent
Chang et al.

(10) Patent No.: US 10,547,796 B2
(45) Date of Patent: Jan. 28, 2020

(54) CALIBRATION EQUIPMENT AND CALIBRATION METHOD OF A MECHANICAL SYSTEM

(71) Applicant: Industrial Technology Research Institute, Hsinchu (TW)

(72) Inventors: Yung-Jung Chang, Hsinchu (TW); Jyun-Ji Wang, Pingtung County (TW); Jwu-Sheng Hu, Hsinchu County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 787 days.

(21) Appl. No.: 14/979,270

(22) Filed: Dec. 22, 2015

(65) Prior Publication Data

US 2017/0019611 A1  Jan. 19, 2017

Related U.S. Application Data (60) Provisional application No. 62/192,069, filed on Jul. 14, 2015.

(30) Foreign Application Priority Data

Nov. 9, 2015 (TW) .............................. 104136800 A (51) Int. Cl.
*H04N 5/247* (2006.01)
*H04N 5/225* (2006.01)
(Continued)

(52) U.S. Cl.
CPC ............ *H04N 5/247* (2013.01); *B25J 9/1692* (2013.01); *H04N 7/181* (2013.01)

(58) Field of Classification Search
CPC ....... H04N 5/247; H04N 7/181; B25J 9/1692; G06T 7/001; G06T 2207/30164; G05B 2219/39033
(Continued)

(56) References Cited

U.S. PATENT DOCUMENTS 4,788,440 A   11/1988 Pryor
5,907,229 A    5/1999 Snell
(Continued)

FOREIGN PATENT DOCUMENTS

CN    102485441 A    6/2012
EP      0770219      10/1999
(Continued)

OTHER PUBLICATIONS

Yong Liu et al., "Development and Sensitivity Analysis of a Portable Calibration System for Joint Offset of Industrial Robot," Intelligent Robots and Systems, Oct. 2009, 7 pages, IEEE, US.
(Continued)

*Primary Examiner* — Matthew K Kwan (57) ABSTRACT

A calibration equipment of a mechanical system includes a light emitter emitting a light beam, a light sensing module, and an operating module. The light sensing module includes a carrier plate, and a plurality of light sensing units located on the carrier plate. The plurality of light sensing units receive the light beam and generate a plurality of image data. The operating module receives the plurality of image data and generates a calibrated kinematic parameter.

17 Claims, 9 Drawing Sheets

(51) Int. Cl.
*G06T 7/00* (2017.01)
*B25J 9/16* (2006.01)
*H04N 7/18* (2006.01)

(58) Field of Classification Search
USPC .......................................................... 348/86
See application file for complete search history.

(56) References Cited

U.S. PATENT DOCUMENTS

| | | | |
|---|---|---|---|
| 6,044,308 | A | 3/2000 | Huissoon |
| 6,172,330 | B1* | 1/2001 | Yamamoto ......... B23K 26/0661 |
| | | | 219/121.7 |
| 7,899,577 | B2 | 3/2011 | Ban et al. |
| 8,290,618 | B2 | 10/2012 | Demopoulos |
| 8,472,029 | B2 | 6/2013 | Bridges et al. |
| 2007/0140826 | A1* | 6/2007 | Ho ..................... H01L 21/67167 |
| | | | 414/800 |
| 2009/0118864 | A1* | 5/2009 | Eldridge ................ B25J 9/1692 |
| | | | 700/259 |
| 2009/0157226 | A1 | 6/2009 | de Smet |
| 2011/0029131 | A1 | 2/2011 | Ban et al. |
| 2012/0050528 | A1 | 3/2012 | Davies et al. |
| 2014/0067317 | A1 | 3/2014 | Kobayashi et al. |
| 2015/0146029 | A1* | 5/2015 | Venkataraman ...... G06T 3/4053 |
| | | | 348/218.1 |

FOREIGN PATENT DOCUMENTS

| | | |
|---|---|---|
| FR | 2696969 A1 | 4/1994 |
| TW | I306281 | 2/2009 |
| TW | 201144003 | 12/2011 |
| TW | 201217123 A1 | 5/2012 |
| WO | WO 9912082 | 3/1999 |
| WO | WO 2014060516 A1 | 4/2014 |

OTHER PUBLICATIONS

In-Won Park et al., "Laser-Based Kinematic Calibration of Robot Manipulator Using Differential Kinematics," Mechatronics, Jun. 2011, pp. 1059-1067, vol. 17, Issue 6, IEEE, US.

Yong Liu et al., "An Automated Method to Calibrate Industrial Robot Joint Offset Using Virtual Line-Based Single-Point Constraint Approach," Intelligent Robots and Systems, Oct. 2009, pp. 715-720, IEEE, US.

E. Nieves et al., "A Reflected Laser Line Approach for Industrial Robot Calibration," Advanced Intelligent Mechatronics, Jul. 2012, pp. 610-615, IEEE, US.

W. S. Newman et al., "A New Method for Kinematic Parameter Calibration Via Laser Line Tracking," Robotics and Automation, May 1993, pp. 160-165, vol. 2, IEEE, US.

China Patent Office, Office Action, Patent Application Serial No. 201510982647.3, dated Jul. 3, 2018, China.

Taiwan Patent Office, Office Action, Patent Application Serial No. 104136800, dated Apr. 11, 2017, Taiwan.

* cited by examiner

CALIBRATION EQUIPMENT AND CALIBRATION METHOD OF A MECHANICAL SYSTEM

CROSS-REFERENCE TO RELATED APPLICATION

This application claims the priority benefits of U.S. provisional application Ser. No. 62/192,069, entitled "APPARATUS AND METHOD FOR ROBOT ACCURACY CALIBRATION AND MONITORING", on Jul. 14, 2015. This application claims the priority benefits of Taiwan application serial No. 104136800, entitled "CALIBRATION AND MONITORING EQUIPMENT OF MECHANICAL SYSTEM", on Nov. 9, 2015. The entirety of the above-mentioned patent application is hereby incorporated by reference herein.

TECHNICAL FIELD

The technical field relates to a calibration equipment and a calibration method of a mechanical system.

BACKGROUND

As improvement of automation technologies, the industry began to manufacture and assemble products by using the intelligent automation based on robot systems to improve the yield and the product quality. For example, the robot arms are introduced to applications of welding, cutting, dispensing and assembly. It is essential to maintain reliability of production, high repetition, and absolute accuracy in a long-term process in order to meet the requirements of the product quality. However, any errors that occur in the robot systems or the peripheral equipment thereof lead to shut down the production line. Great amount of time and money will be wasted. Therefore, errors and mechanical deviation caused by a long-term operation or repair shall be eliminated by the accuracy calibration. In addition to off-line calibration, users may directly calibrate robot arms in the production line (in-line) to save time and labors of dismantle, transport, and assembly. In general, most of the robot manufacturers do not provide services of calibration at a customer's factory or an on-site service. The users have to dismantle and transport the robot systems back to the original equipment manufacturers by ocean shipping or air transportation, which is time consuming and costly. Currently, only a few companies provide simple on-site calibration. Most of the robot systems still have to be disassembled and then sent back to the original equipment manufacturers in local or airlifted to the foreign equipment manufacturers. The service of high accuracy calibration or on-site calibration is difficult to widespread since one of the reasons is the expensive and huge factors of the calibration equipment. In the industry chain, lacking of absolute accuracy calibration becomes a restriction to develop a production line with a high precision.

In general, before shipment, robot arms will be calibrated and tuned repeatedly to meet an absolute precision. The robot arms will work at the absolute precision at the beginning. But after a prolonged use, the precision of the robot arms is hard to maintain because of mechanical deviation. The mechanical deviation may be caused by metal fatigue or repair such as replacement of motors or gears. Absolute accuracy calibration may solve these problems to ensure the precision ranges in a reasonable interval and improve the reliability in production lines.

SUMMARY

An embodiment of the disclosure relates to a calibration equipment of a mechanical system. The calibration equipment includes a light emitter emitting a light beam, a light sensing module, and an operating module. The light sensing module includes a carrier plate, and a plurality of light sensing units located on the carrier plate. The plurality of light sensing units receive the light beam and generate a plurality of image data. The operating module receives the plurality of image data and generates a calibrated kinematic parameter.

Another embodiment of the disclosure relates to a calibrating method of a mechanical system. The calibrating method includes: emitting a light beam; receiving the light beam and transforming the light beam into a plurality of image data; and analyzing a plurality of deviations between the plurality of image data and a plurality of corresponding motion commands and generating a calibrated kinematic parameter.

The foregoing will become better understood from a careful reading of a detailed description provided herein below with appropriate reference to the accompanying drawings.

DETAILED DESCRIPTION OF DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

An embodiment of the present disclosure discloses a calibration and monitoring equipment for a robot arm. In addition, an embodiments of the present disclosure discloses a calibration method for a robot arm. The calibration equipment provides robot manufactures with checking or slightly changing robot arms so that it moves correctly before the shipment of the robot arms. The calibration equipment may compensate the offset deviation of the precision caused by manufacturing or assembly errors. The present calibration equipment provides manufactures with checking and alerting the precision of the robot arms in production lines. The present calibration equipment may make sure exact positions and the precision of the robot arm in the production lines. In addition, the present calibration equipment may reduce expensive cost of general calibration instruments.

Figure 1:
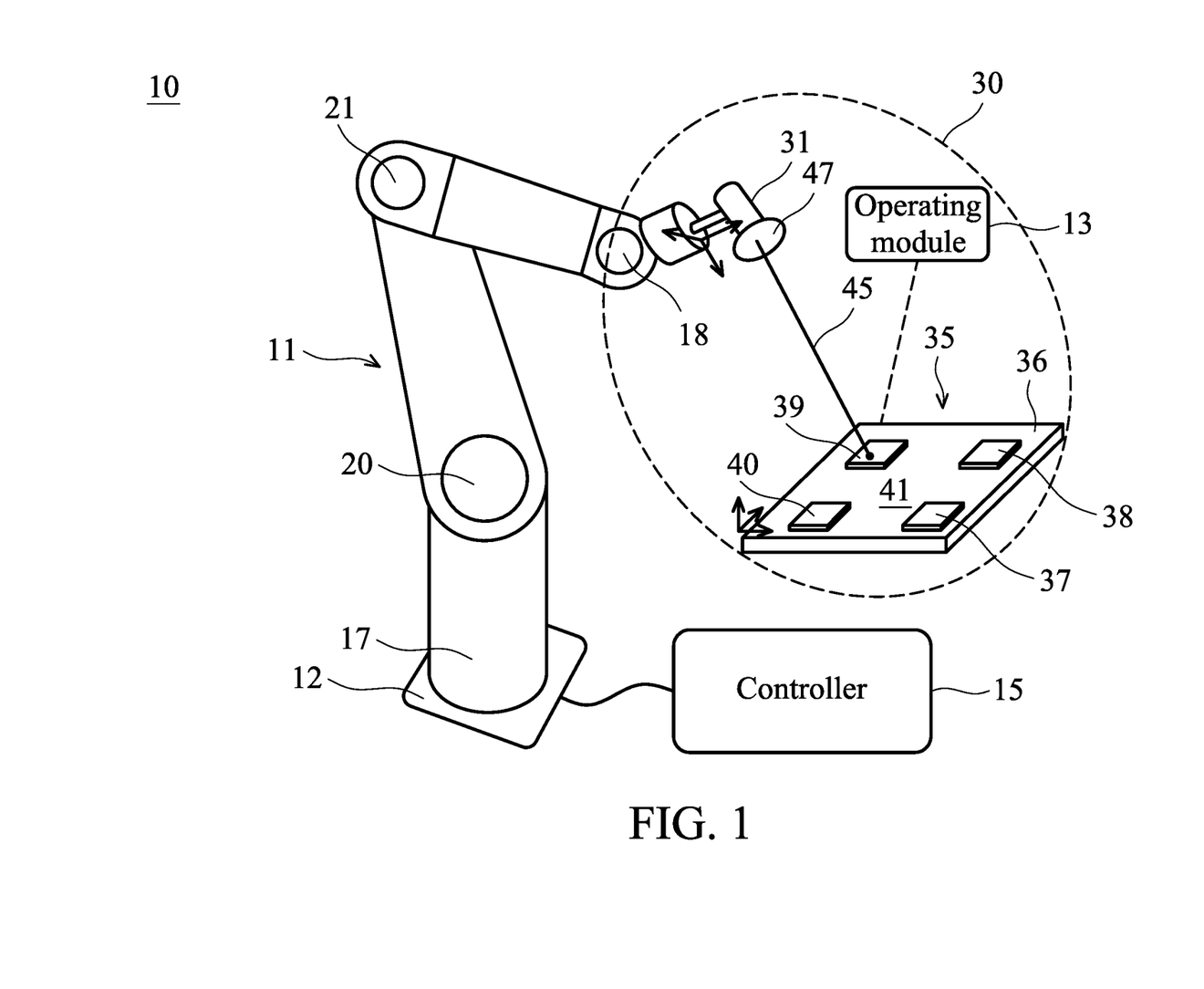
FIG. 1 is a diagram illustrating a mechanical system and a light sensing module in accordance with an embodiment of the present disclosure.

FIG. 1 is a diagram illustrating a mechanical system 10 and a light sensing module 35 in accordance with an embodiment of the present disclosure. The mechanical system 10 includes a robot arm 11, a base 12, a controller 15, and motors. The robot arm 11 includes a first end 17, a second end 18, and joints 20 and 21. The first end 17 is connected to the base 12; the second end 18 may be equipped with some components such as a laser head, a dispenser, a welding head, a cutting head, and a gripping head. The joints 20 and 21 provide the robot arm 11 to rotate and join two arms of the robot arm 11. In accordance with different applications, there are different numbers of joints and arms, but the scope of the present disclosure is not limited to this embodiment. The base 12 may be a rotatable base or a fixed base. The controller 15 is connected to the robot arm 11, wherein the controller 15 further includes a processor, memories, and built-in software. The controller 15 controls the movement of the robot arm 11.

Referring to the embodiment of FIG. 1, a calibration equipment 30 includes a light emitter 31, an operating module 13, and a sensing module 35. The operating module 13 is located in a shell 36 or outside of the shell 36. The operating module 13 further includes a processor or central processing unit (CPU), memories, and built-in software. The sensing module 35 includes the shell 36 and light sensing units 37, 38, 39, and 40. The light sensing units 37, 38, 39, and 40 are located on a carrier plate 41 of the shell 36, wherein sensing surfaces of the light sensing units 37, 38, 39, and 40 face outward. The light sensing units 37, 38, 39, and 40 also electrically connect the operating module 13. The light emitter 31 is implemented by a light emitting device, such as a laser or a light emitting diode (LED). The light sensing units 37, 38, 39, and 40 are two-dimensional image sensors, such as charge-coupled devices (CCD) or complementary metal-oxide-semiconductor (CMOS) image sensors. Further, the light sensing units 37, 38, 39, and 40 receive a light beam 45 projected by the light emitter 31. The light sensing units 37, 38, 39, and 40 then transform projected images or points of the light beam 45 into digital signals. In addition, the sensing module 35 may link the controller 15. After the operating module 13 processes the digital signals, the digital signals are then transmitted to the controller 15 via a digital linking. The digital linking may be, but not limited to a wiring or transmission lines connected between the sensing module 35 and the controller 15. In an embodiment, the digital signals are temporarily saved in memories of the sensing module 35. Later, a universal serial bus (USB) flash driver is plugged in a USB port of the sensing module 35 to access the digital signals. Then the USB flash drive is plugged in the controller 15 to load the digital signals. By using the USB flash driver, the digital signals are transferred to the controller 15. In an embodiment, the digital signals are transferred from the sensing module 35 to the controller 15 via a wireless communication.

In another embodiment, the number of the light sensing units is two or more. In another embodiment, the number of the light sensing units is 2N, wherein N is a positive integer. In another embodiment, the number of the light sensing units is 3N, wherein N is a positive integer. It may be found from the real operation—that utilizing two or more light sensing units may obtain an accurate calibration result to make sure that the precision of the robot arm 11 ranges in a reasonable interval.

In an embodiment, the calibration equipment 30 further includes an optical mask 47. The light beam 45 penetrates through the optical mask 47. This causes physic characteristics such as interference, diffraction, shadowing and so on, therefore, the light beam 45 is transformed into a projection of two-dimensional characteristic pattern or geometric pattern. The light sensing units 37, 38, 39, and 40 then receive the projection of two-dimensional characteristic pattern or geometric pattern caused by the optical mask 47, wherein the geometric pattern or the two-dimensional characteristic pattern may provide a better recognition pattern. So that, the operating module 13 may clearly positioning reference positions of the characteristic pattern so as to obtain an accurate image data.

In an embodiment, users may choose not to install the optical mask 47. The light beam 45 naturally has a spot-pattern projection. By using the spot-pattern projection, the light beam 45 may be projected on the light sensing units 37, 38, 39, and 40 to obtain an image data.

Figure 2:
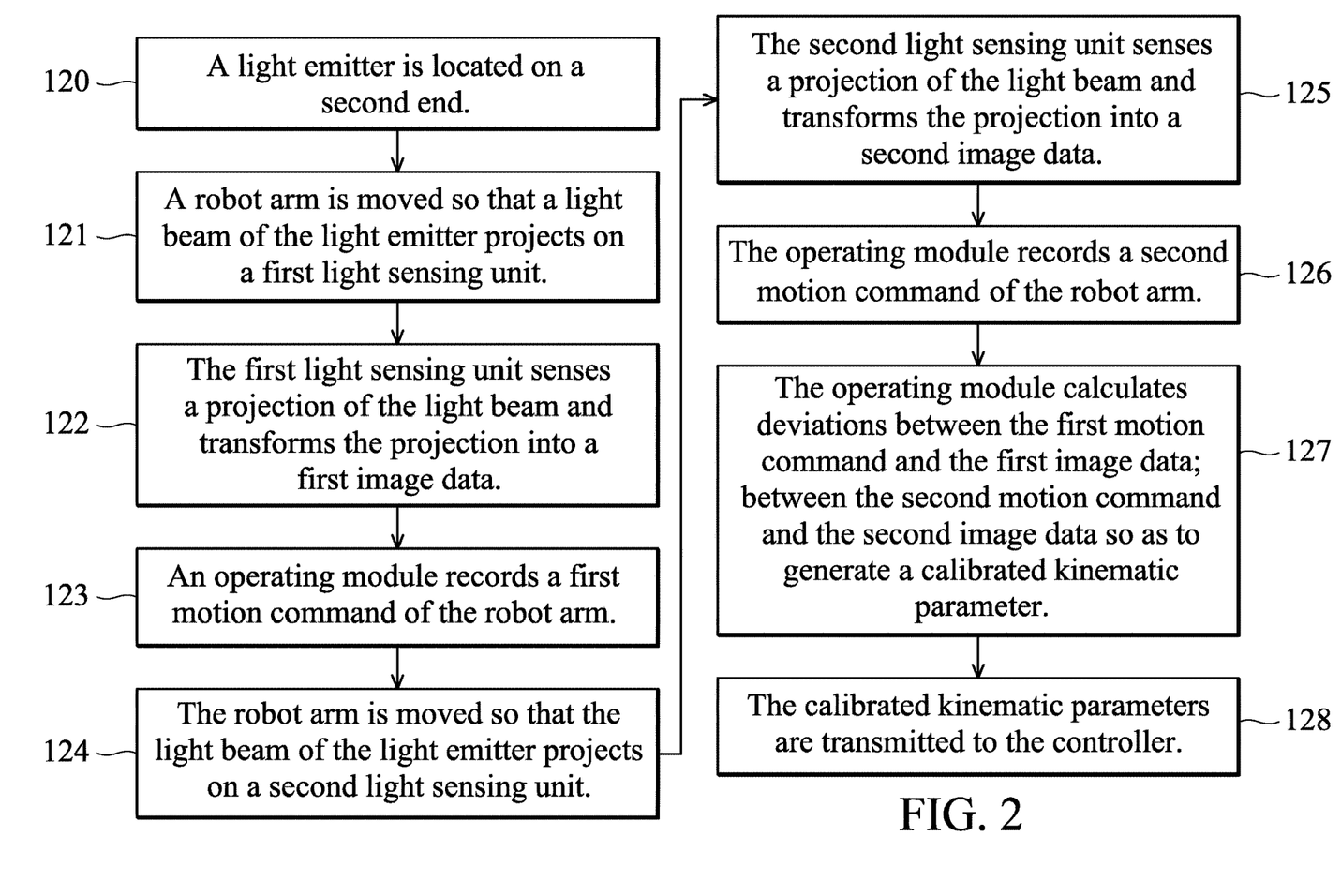
FIG. 2 is a flowchart of operating the calibration equipment in accordance with an embodiment of the present disclosure.

FIG. 2 is a flowchart of operating the calibration equipment 30 in accordance with an embodiment of the present disclosure. In a step 120, the light emitter 31 is installed and fixed on the second end 18 by using screws or clamps. In one embodiment, an optical mask 47 is further located on an emit end of the light emitter 31. The light beam 45 penetrates through the optical mask 47. This causes physic characteristics such as interference, diffraction, shadowing and so on, therefore, the light beam 45 is transformed into a projection of two-dimensional characteristic pattern or geometric pattern.

In a step 121, an external command is inputted to the controller 15. The command is manually inputted by users to control the robot arm 11. The robot arm 11 is then moved to a position or an angle so that the light beam 45 of the light emitter 31 may be projected on the light sensing unit 37. In another embodiment, the operating module 13 further includes a built-in command to control the robot arm 11. The built-in command is transmitted to the controller 15 via a digital linking. The robot arm 11 is then simultaneously moved to a position or an angle so that the light beam 45 of the light emitter 31 may be projected on the light sensing unit 37.

In a step 122, the light sensing unit 37 senses a projection of the light beam 45. Pixels of the light sensing unit 37 are irradiated and outputted as digital signals, which are referred as a first image data $X_{measure1}$. The first image data $X_{measure1}$ represents a single point or a set of position points. In an embodiment, the light sensing unit 37 receives a projection of geometric pattern or two-dimensional characteristic pattern, which is generated by the optical mask 47. The geometric pattern or the two-dimensional characteristic pattern may provide a better recognition pattern. So that, the operating module 13 may clearly positioning reference positions of the characteristic pattern to obtain an accurate image data. Positioning reference positions of the characteristic pattern may choose, for example, a right angle, intersections, voids, gaps, long and short axis, focal, and endpoints. Therefore, the first image data $X_{measure1}$ represents a set of position points of the two-dimensional characteristic pattern.

In a step 123, the operating module 13 records a first motion command $X_{point1}$ of the robot arm 11 corresponding to the first image data $X_{measure1}$. The first motion command $X_{point1}$ represents a three-dimensional position of a projected point or a projected image in the coordinate system of a calibration equipment (herein refers to the sensing module 35). In other words, the first motion command $X_{point1}$ represents a predicted point or a predicted image based on a motion function of the robot arm 11. Derivation and explanation of the first motion command $X_{point1}$ are as follows. A multi-axis robot kinematic model of the robot arm 11 may be derived as a matrix function:

$$\begin{bmatrix} X \\ \psi \end{bmatrix}_{robot} = F(n_{robot}, \theta) \quad (1)$$

The X denotes a position of the second end 18 of the robot arm 11, wherein the X is a three-dimensional coordinate. The Ψ denotes rotation angles of the second end 18 of the robot arm 11, wherein the Ψ is also a three-dimensional representation. The θ denotes rotation angles of all joints of the robot arm 11. The $\eta_{robot}$ denotes a six-dimensional space conversion parameter of the robot arm 11, that is to say, the $\eta_{robot}$ is a kinematic parameter of the robot arm 11. In this embodiment, in the coordinate system of the sensing module 35, positions of projected points or images on the sensing module 35 emitted from the light beam 45 may be expressed as the following function:

$$X_{point1} = G(\eta_{emitter}, \eta_{senser-robot}, F(\eta_{robot}, \theta)) \quad (2)$$

The first motion command $X_{point1}$ denotes positions of projected points or images, which are projected from the light beam 45 on the light sensing unit 37. In other words, the first motion command $X_{point1}$ represents three-dimensional positions of the projected points or images in the coordinate system of the sensing module 35. The $\eta_{emitter}$ denotes a three-dimensional position and a direction of the light emitter 31, which is fixed on the second end 18 of the robot arm 11. The $\eta_{senser-robot}$ denotes a six-dimensional space conversion parameter between the robot arm 11 and the sensing module 35. The $F(\eta_{robot}, \theta)$ denotes a kinematic model of the robot arm 11. The $\eta_{robot}$ denotes a six-dimensional space conversion parameter of the robot arm 11. The θ denotes rotation angles of all joints of the robot arm 11.

In a step 124, an external command is inputted to the controller 15. The command is manually input by users or from the sensing module 35 to control the robot arm 11. The robot arm 11 is then moved to a position or an angle so that the light beam 45 of the light emitter 31 may be projected on the light sensing unit 38.

In a step 125, the light sensing unit 38 senses a projection of the light beam 45. Pixels of the light sensing unit 38 are irradiated and then outputted as digital signals, which are referred as a second image data $X_{measure2}$. The second image data $X_{measure2}$ represents a single point or a set of position points. In an embodiment, the light sensing unit 38 receives a projection of geometric pattern or two-dimensional characteristic pattern, which is generated by the optical mask 47. The geometric pattern or the two-dimensional characteristic pattern may provide a better recognition pattern. So that, the operating module 13 may clearly positioning reference positions of the characteristic pattern to obtain an accurate image data. The second image data $X_{measure2}$ thus represents a set of position points of the two-dimensional characteristic pattern.

In a step 126, the operating module 13 records a second motion command $X_{point2}$ of the robot arm 11 corresponding to the second image data $X_{measure2}$. The second motion command $X_{point2}$ represents a three-dimensional position of a projected point or a projected image in the coordinate system of the sensing module 35. In other words, the second motion command $X_{point2}$ represents a predicted point or a predicted image based on the motion function of the robot arm 11. Derivation and explanation of the second motion command $X_{point2}$ are similar to the aforementioned function (2).

In a step 127, the operating module 13 calculates a deviation $\Delta X_1$ between the first motion command $X_{point1}$ and the first image data $X_{measure1}$. The deviation $\Delta X_1$ may be expressed as an equation of $\Delta X_1 = X_{measure1} - X_{point1}$. The deviation $\Delta X_1$ represents a position error (or referred as a drift) between a position of the projection predicted by the robot arm 11 and a projected position in reality received by the light sensing unit 37. In other words, a three-dimensional position of a projected point or a projected image is different from a predicted three-dimensional position of the projection based on the kinematic model of the robot arm 11. Similarly, the operating module 13 calculates a deviation $\Delta X_2$ between the second motion command $X_{point2}$ and the second image data $X_{measure2}$. The deviation $\Delta X_2$ may be expressed as an equation of $\Delta X_2 = X_{measure2} - X_{point2}$. In addition, the operating module 13 respectively analyzes the deviations $\Delta X_1$ between the first motion command $X_{point1}$ and the first image data $X_{measure1}$; and the deviations $\Delta X_2$ between the second motion command $X_{point2}$ and the second image data $X_{measure2}$. By using a numerical method, the operating module 13 adjusts the kinematic parameters such as $\eta_{emitter}$, $\eta_{senser-robot}$, and $\eta_{robot}$ so that both the deviations $\Delta X_1$ and $\Delta X_2$ are minimized and approached to zero. Further, after the operation, the operating module 13 acquires calibrated kinematic parameters such as $\eta'_{emitter}$, $\eta'_{robot}$, and $\eta'_{sensor-robot}$, wherein those calibrated kinematic parameters may simultaneously minimize the deviations $\Delta X_1$ and $\Delta X_2$.

In a step 128, after the operating module 13 processes the calibrated kinematic parameters, the calibrated kinematic parameters are then transmitted to the controller 15 via a digital linking. The digital linking may be, but not limited to a wiring or transmission line connected between the sensing module 35 and the controller 15. In an embodiment, a universal serial bus (USB) flash driver is plugged in a USB port of the sensing module 35 to access the calibrated kinematic parameters. Then the USB flash driver is plugged in the controller 15 to load the calibrated kinematic parameters. By using the USB flash driver, the calibrated kinematic parameters are transferred to the controller 15. In an embodiment, the calibrated kinematic parameters are transferred from the sensing module 35 to the controller 15 via a wireless communication. So that, the controller 15 receives the calibrated kinematic parameters $\eta'_{emitter}$, $\eta'_{robot}$, and $\eta'_{sensor-robot}$ to substitute and modify the original kinematic parameters of the motion commands $X_{point}$. After the aforementioned calibration steps, a projected position in reality received by the light sensing units 37 and 38 will match a position of the projection predicted by the robot arm 11. Therefore, a three-dimensional position of the second end 18 of the robot arm 11 may approximate to a predicted three-dimensional position of the second end 18 based on the calibrated kinematic model of the robot arm 11. The calibration equipment 30 provides manufacturers for calibration before shipment of the robot arms. The calibration equipment 30 may compensate the deviation of precision, which is caused by manufacturing or assembly errors. The calibration equipment 30 also provides users to calibrate the robot arms regularly in the production lines of factories.

In one embodiment, precision data of the robot arm 11 before calibration are as shown in Table A.

TABLE A

| Result(unit: mm) | X | Y | Z | Length |
|---|---|---|---|---|
| Sampling points | 100 | 100 | 100 | 100 |
| Maximum deviation | 3.1 | 2.65 | 3.48 | 3.59 |
| RMS deviation | 1.2 | 0.76 | 1.29 | 1.88 |

The precision data in Table A are measured by a laser tracker, wherein a sampling procedure is performed at 100 different positions in a working area of the robot arm 11. It may be seen from the Table A that the maximum deviation is 3.1 mm in the X axis direction. The root-mean-square (RMS) deviation is 1.2 mm in the X axis direction. The maximum deviation is 2.65 mm in the Y axis direction. The RMS deviation is 0.76 mm in the Y axis direction. The maximum deviation is 3.48 mm in the Z axis direction. The RMS deviation is 1.29 mm in the Z axis direction. The maximum deviation of lengths (or distance) is 3.59 mm. The RMS deviation of lengths (or distance) is 1.88 mm. After calibrating the robot arm 11 by the calibration equipment 30, the laser tracker measures precision data again by the same conditions shown in Table B. In this case, we utilized three light sensing units of the sensing module 35 and then the robot arm 11 poses to project the light beam 45 on each light sensing unit.

TABLE B

| Result (unit: mm) | X | Y | Z | Length |
|---|---|---|---|---|
| Sampling points | 100 | 100 | 100 | 100 |
| Maximum deviation | 0.54 | 0.38 | 0.6 | 0.65 |
| RMS deviation | 0.2 | 0.13 | 0.24 | 0.34 |

The precision data in Table B are measured by a laser tracker, wherein a sampling procedure is performed at 100 different positions in a working area of the robot arm 11. The maximum deviation is 0.54 mm in the X axis direction. The RMS deviation is 0.2 mm in the X axis direction. The maximum deviation is 0.38 mm in the Y axis direction. The RMS deviation is 0.13 mm in the Y axis direction. The maximum deviation is 0.6 mm in the Z axis direction. The RMS deviation is 0.24 mm in the Z axis direction. The maximum deviation of lengths (or distance) is 0.65 mm. The RMS deviation of lengths (or distance) is 0.34 mm. Referring to Tables A and B, it may be seen that the deviations of any axis (X, Y, and Z axis) or lengths are substantially decreased after the calibration equipment 30 calibrated the robot arm 11. Therefore, it proves that the precision of the robot arm 11 may be improved by using the calibration equipment 30.

In an embodiment, referring back to FIG. 1, an external command is inputted to the controller 15. The command is manually inputted by users or a built-in command from the calibration equipment 30 to control the robot arm 11. The robot arm 11 is then moved to a position or an angle so that the light beam 45 of the light emitter 31 is projected on light sensing units 37, 38, 39, and 40. Each of the light sensing units 37, 38, 39, and 40 receives a single projection of the light beam 45. That is, each of the light sensing units 37, 38, 39, and 40 senses one projection and then transforms the one projection into one image data corresponding to one motion command of the robot arm 11. Detail operations are described below. The light sensing units 37, 38, 39, and 40 respectively sense a projection of the light beam 45. Pixels of the light sensing units 37, 38, 39, and 40 are irradiated and outputted as image data $X_{measure11}$, $X_{measure12}$, $X_{measure13}$, and $X_{measure14}$. The image data $X_{measure11}$, $X_{measure12}$, $X_{measure13}$, and $X_{measure14}$ represent a single point or a set of position points. In an embodiment, the light sensing units 37, 38, 39, and 40 respectively receive a projection of geometric pattern or two-dimensional characteristic pattern, which is generated by the optical mask 47. The geometric pattern or the two-dimensional characteristic pattern may provide a better recognition pattern. So that, the operating module 13 may clearly positioning reference positions of the characteristic pattern to obtain an accurate image data. Therefore, the image data $X_{measure11}$, $X_{measure12}$, $X_{measure13}$, and $X_{measure14}$ respectively represent a set of position points of the two-dimensional characteristic patterns. Then, the operating module 13 records motion commands $X_{point11}$, $X_{point12}$, $X_{point13}$, and $X_{point14}$ of the robot arm 11 respectively corresponding to the image data $X_{measure11}$, $X_{measure12}$, $X_{measure13}$, and $X_{measure14}$. The motion commands $X_{point11}$, $X_{point12}$, $X_{point13}$, and $X_{point14}$ respectively represent a three-dimensional position of a projected point or a projected image in the coordinate system of the sensing module 35. Derivation and explanation of the motion commands $X_{point11}$, $X_{point12}$, $X_{point13}$, and $X_{point14}$ are similar to the function (2). Next, the operating module 13 calculates deviations $\Delta X_{11}$, $\Delta X_{12}$, $\Delta X_{13}$, and $\Delta X_{14}$ respectively between the motion commands ($X_{point11}$, $X_{point12}$, $X_{point13}$, and $X_{point14}$) and the image data ($X_{measure11}$, $X_{measure12}$, $X_{measure13}$, and $X_{measure14}$). The deviations $\Delta X_{11}$, $\Delta X_{12}$, $\Delta X_{13}$, and $\Delta X_{14}$ may be expressed as an equation of $\Delta X_{1n} = X_{measure1n} - X_{point1n}$. The deviations $\Delta X_{1n}$ respectively represent a position mismatch between a position of the projection predicted by the robot arm 11 and a projected position in reality received by the light sensing units 37, 38, 39, and 40. By using a numerical method, the operating module 13 adjusts the kinematic parameters such as $\eta_{emitter}$, $\eta_{senser-robot}$, and $\eta_{robot}$ so that both the deviations $\Delta X_{11}$, $\Delta X_{12}$, $\Delta X_{13}$, and $\Delta X_{14}$ are minimized and approached to zero. Further, after the operation, the operating module 13 acquires calibrated kinematic parameters such as $\eta'_{emitter}$, $\eta'_{robot}$, and $\eta'_{sensor-robot}$, wherein those calibrated kinematic parameters may simultaneously minimize the deviations $\Delta X_{11}$, $\Delta X_{12}$, $\Delta X_{13}$, and $\Delta X_{14}$. Next, after the operating module 13 processes the calibrated kinematic parameters, the calibrated kinematic parameters are then transmitted to the controller 15 by a digital linking. So that, the controller 15 receives the calibrated kinematic parameters $\eta'_{emitter}$, $\eta'_{robot}$, and $\eta'_{sensor-robot}$ to substitute and modify the original kinematic parameters of the motion commands $X_{pointn}$. After the aforementioned calibration steps, a projected position in reality received by the light sensing units 37, 38, 39, and 40 will match a position of the projection predicted by the robot arm 11.

Referring back to FIG. 1, in an embodiment, various external commands are inputted to the controller 15 to control the robot arm 11. The robot arm 11 is then moved to a position or an angle so that the light beam 45 of the light emitter 31 may be projected on light sensing units 37 and 38. Each of the light sensing units 37 and 38 receives at least two projections of the light beam 45. That is, each of the light sensing units 37 and 38 senses at least two projections and then transforms the at least two projections into image data corresponding to at least two motion commands of the robot arm 11. In an embodiment, the at least two motion commands are built-in commands saved in the operating module 13, wherein the built-in commands control the robot arm 11. The built-in commands thus are transmitted to the controller 15 via a digital linking. The robot arm 11 is then simultaneously moved to various positions or angles so that the light beam 45 of the light emitter 31 may be projected on the light sensing units 37 and 38. In an embodiment, the at least two motion commands are manually inputted by users to control the robot arm 11. The robot arm 11 is then moved to various positions or angles so that the light beam 45 of the light emitter 31 may be projected on the light sensing units 37 and 38. Detail operations are described below. The light sensing unit 37 senses at least two projections of the light beam 45. Pixels of the light sensing unit 37 are irradiated and outputted as image data $X_{measure21}$. The image data $X_{measure21}$ represents a single point or a set of position points. Next, the operating module 13 records a motion command $X_{point21}$ of the robot arm 11 corresponding to the image data $X_{measure21}$. The motion command $X_{point21}$ represents a three-dimensional position of a projected point or a projected image in the coordinate system of the sensing module 35. Derivation and explanation of the motion command $X_{point21}$ is similar to the function (2). Under the same light sensing unit 37, the robot arm 11 is moved to another gesture, but the light beam 45 is still projected on the light sensing unit 37. For example, rotation angles of the joints 20 and 21 are changed; angles between the light beam 45 and the surface of the light sensing unit 37 are changed; relative positions between the sensing module 35 and the second end 18 are changed. Then, the operating module 13 records image data $X_{measure22}$ and its corresponding motion command $X_{point22}$. Further, the robot arm 11 is moved to various gestures and projects the light beam 45 on the light sensing unit 37. The operating module 13 records image data $X_{measure2n}$ and their corresponding motion commands $X_{point2n}$. Next, the operating module 13 calculates deviations $\Delta X_{2n}$ between the motion commands $X_{point2n}$ and the image data $X_{measure2n}$. The deviations $\Delta X_{2n}$ may be expressed as an equation of $\Delta X_{2n} = X_{measure2n} - X_{point2n}$, wherein n is a positive integer. Further, the robot arm 11 is moved to various gestures and projects the light beam 45 on the light sensing unit 38. The operating module 13 records image data $X_{measure3n}$ and their corresponding motion commands $X_{point3n}$. In an embodiment, the light sensing units 37 and 38 respectively receive geometric-pattern projections or two-dimensional projections having characteristic patterns, which are generated by the optical mask 47. The geometric-patterns or the two-dimensional characteristic patterns provide a better recognition pattern. So that, the operating module 13 may clearly positioning reference positions of the characteristic pattern to obtain an accurate image data. Therefore, the image data $X_{measure2n}$ and $X_{measure3n}$ respectively represent a set of position points of the two-dimensional projections having characteristic patterns. Next, the operating module 13 calculates deviations $\Delta X_{3n}$ between the motion commands $X_{point3n}$ and the image data $X_{measure3n}$. The deviations $\Delta X_{3n}$ may be expressed as an equation of $\Delta X_{3n} = X_{measure3n} - X_{point3n}$, wherein n is a positive integer. By using a numerical method, the operating module 13 adjusts the kinematic parameters such as $\eta'_{emitter}$, $\eta_{senser-robot}$, and $\eta_{robot}$ so that both the deviations $\Delta X_{2n}$ and $\Delta X_{3n}$ are minimized and approached to zero. Further, after the operation, the operating module 13 acquires calibrated kinematic parameters such as $\eta'_{emitter}$, $\eta'_{robot}$, and $\eta'_{sensor-robot}$, wherein those calibrated kinematic parameters simultaneously minimize the deviations $\Delta X_{2n}$ and $\Delta X_{3n}$. Next, after the operating module 13 processes the calibrated kinematic parameters, the calibrated kinematic parameters are then transmitted to the controller 15 via a digital linking. So that, the controller 15 receives the calibrated kinematic parameters $\eta'_{emitter}$, $\eta'_{robot}$, and $\eta'_{sensor-robot}$ to substitute and modify the original kinematic parameters of the motion commands $X_{pointn}$. After the aforementioned calibration steps, users may make sure that a precision of the robot arm 11 ranges in a reasonable interval.

In an embodiment, the calibration equipment 30 is also applicable to monitor a drift of precision of the robot arm 11 in production lines. Under a long-term production, the robot arm 11 may suffer from metal fatigue, deterioration of rotary shafts, and deterioration of motors so that positions of the second end 18 may deviate. In production, the calibration equipment 30 is introduced as an in-line surveillance or a monitoring equipment. For example, the light sensing units 37, 38, 39, and 40 capture projections of the light emitter 31. The operating module 13 records image data of the projections and their corresponding motion commands of the robot arm 11. Next, the operating module 13 calculates deviations between the motion commands and the image data. The deviations may be, but not limited to position deviations or angle positions. Users may set a predetermined threshold of precision, a precision range, a limitation value, or a threshold value in the operating module 13. When the deviations exceed the predetermined threshold of precision or the precision range, the operating module 13 sends out an alert signal to the controller 15. So that, users or the controller 15 may monitor the precision of the robot arm 11, wherein the alert signal may be transformed into a warning status on a display or a warning light of an LED. In an embodiment, the calibration equipment 30 includes a buzzer electrically connected to the operating module 13. When the deviations exceed a predetermined threshold of precision or a precision range, the buzzer turns on and alarms the users that the precision of the robot arm 11 exceeds a reasonable range for production. In an embodiment, under the application of the in-line surveillance, the calibration equipment 30 further includes an optical mask 47. The light beam 45 penetrates through the optical mask 47. This causes physic characteristics such as interference, diffraction, shadowing and so on, therefore, the light beam 45 is transformed into a projection of two-dimensional characteristic pattern or geometric pattern. Then the light sensing units 37, 38, 39, and 40 receive the projection caused by the optical mask 47, wherein the geometric-pattern or the characteristic pattern provides a better recognition pattern. So that, the operating module 13 may clearly positioning reference positions of the characteristic pattern to obtain an accurate image data. The calibration equipment 30 associated with the optical mask 47 may monitor the deviations in production lines to make sure a reasonable precision of the robot arm 11.

In an embodiment, the calibration equipment 30 further includes a plurality of light emitters (not shown). For example, at least two light emitters are installed on the second end 18 in FIG. 1, wherein light beams of the two light emitters form a predetermined angle. In operation, the two light beams of the light emitters respectively aim at the light sensing units 37 and 38. The operating module 13 records image data of projections of the two light beams and their corresponding motion commands of the robot arm 11. Further, the two light beams of the light emitters respectively aim at the light sensing units 39 and 40. The operating module 13 records image data of projections of the two light beams and their corresponding motion commands of the robot arm 11. Next, the operating module 13 calculates every deviation between each pair of the motion command and the image data. By using a numerical method, the operating module 13 adjusts kinematic parameters so that every deviation is minimized and approached to zero. Further, after the operation, the operating module 13 acquires calibrated kinematic parameters and transmits the calibrated kinematic parameters to the controller 15. So that, the precision of the robot arm 11 ranges in a reasonable interval.

Figure 3:
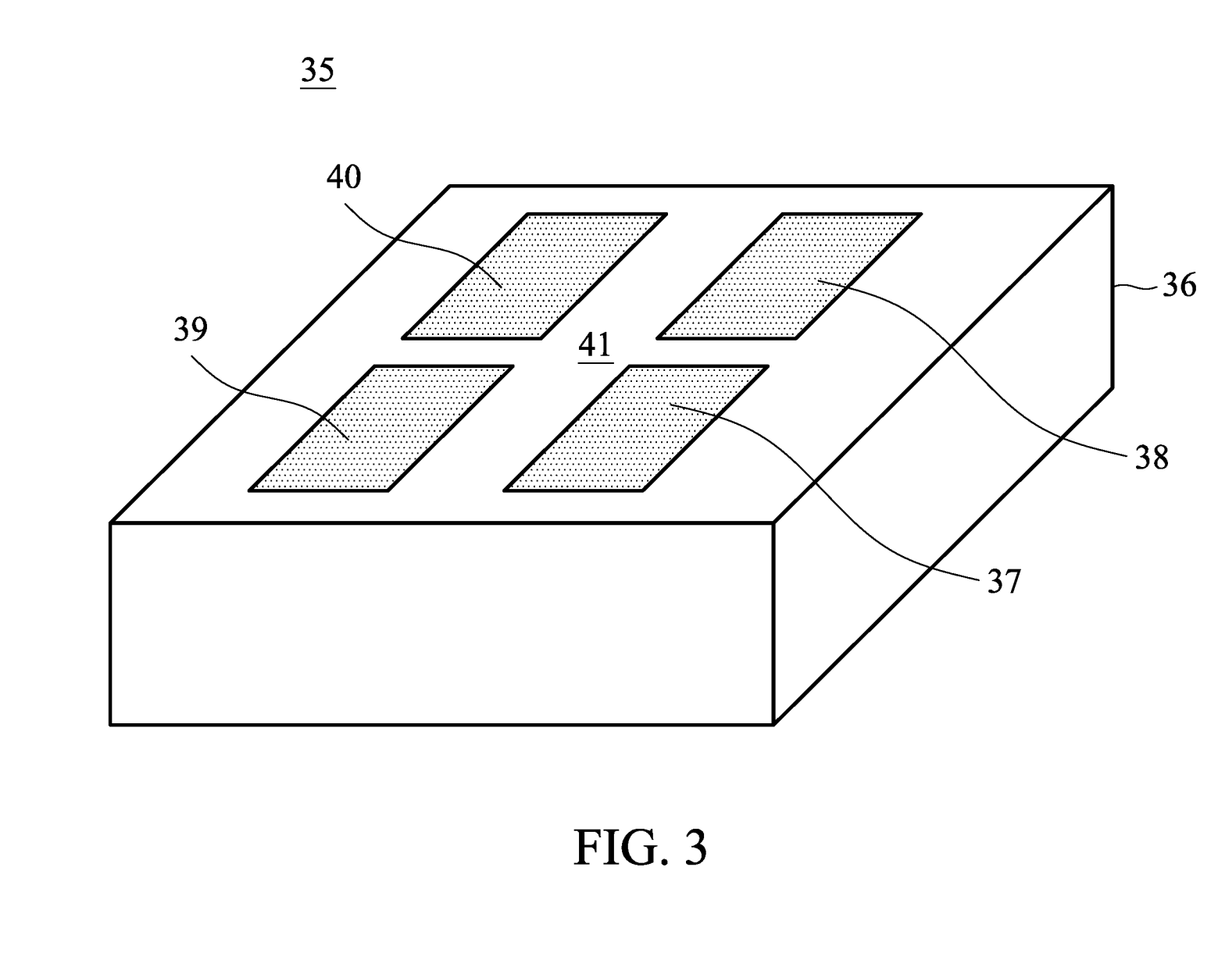
FIG. 3 is an enlarged diagram of a sensing module in accordance with an embodiment of the present disclosure.

FIG. 3 is an enlarged diagram of a sensing module 35 in accordance with an embodiment of the present disclosure. In the embodiment, the light sensing units 37, 38, 39, and 40 are arranged in an array, wherein each light sensing unit is apart from another light sensing unit with a predetermined distance. The predetermined distance has been recorded in the operating module 13, wherein the predetermined distance is useful for the operating module 13 to calculate deviations between image data and motion commands. In addition, the light sensing units 37, 38, 39, and 40 are mounted on the shell 36. Sensing surfaces of the light sensing units 37, 38, 39, and 40 are the same as or similar to a horizontal surface of the carrier plate 41. The number of the light sensing units is not limited to this embodiment. Further, the shell 36 is made of material or metal having a low expansion coefficient, which may prevent the shell 36 from extremely expansion or contraction due to temperature change.

Figure 4:
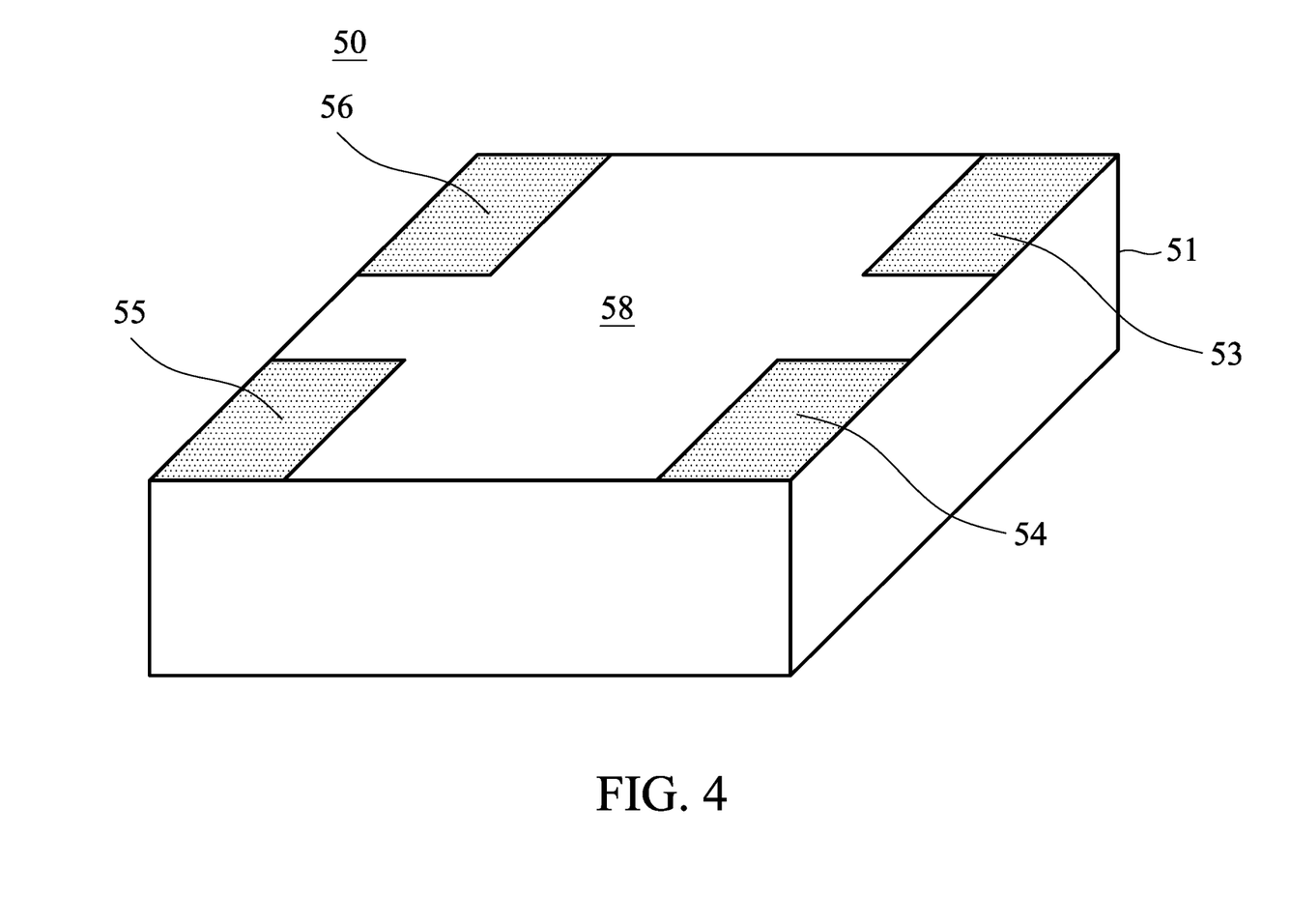
FIG. 4 is an enlarged diagram of a sensing module in accordance with an embodiment of the present disclosure.

FIG. 4 is an enlarged diagram of a sensing module 50 in accordance with an embodiment of the present disclosure. The sensing module 50 includes a shell 51 and light sensing units 53, 54, 55, and 56. The light sensing units 53, 54, 55, and 56 are located on a carrier plate 58, wherein sensing surfaces of the light sensing units face outward. Further, the light sensing units 53, 54, 55, and 56 are electrically connected to the operating module 13. Each of the light sensing units 53, 54, 55, and 56 has a size, which is an 11.3 mm*11.3 mm square. The resolution of the light sensing units is 2048*2048. The carrier plate 58 of the shell 51 is a plane surface having a size, which is 27 cm*27 cm square. In an embodiment, each of the light sensing units 53, 54, 55, and 56 may be arranged at each corner of the carrier plate 58. The light sensing units 53, 54, 55, and 56 are mounted on the shell 51. In an embodiment, the sensing surfaces of the light sensing units 53, 54, 55, and 56 may be the same as or similar to a horizontal surface of the carrier plate 58. The number of the light sensing units is not limited to this embodiment.

Figure 5:
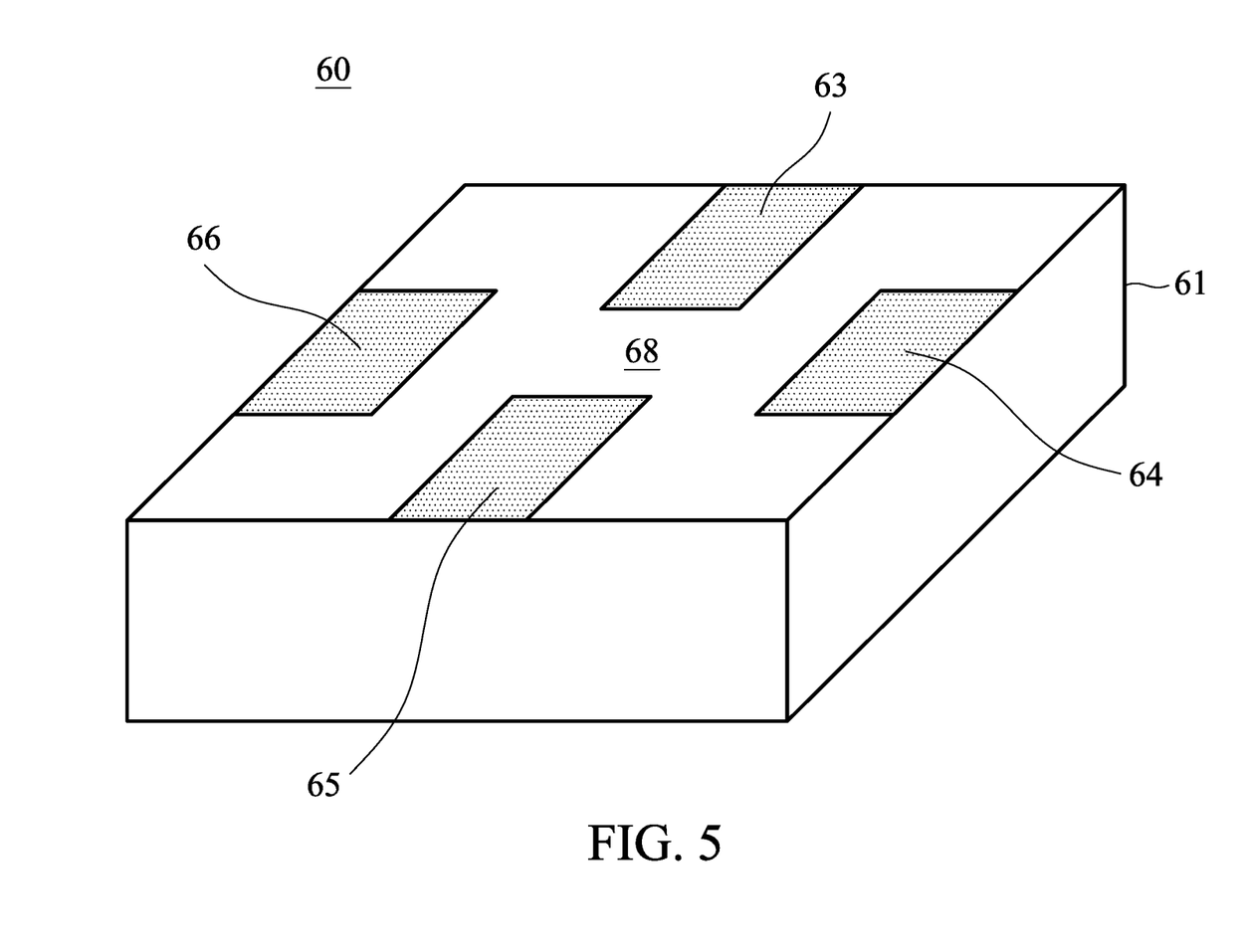
FIG. 5 is an enlarged diagram of a sensing module in accordance with an embodiment of the present disclosure.

FIG. 5 is an enlarged diagram of a sensing module 60 in accordance with an embodiment of the present disclosure. The sensing module 60 includes a shell 61 and light sensing units 63, 64, 65, and 66. The light sensing units 63, 64, 65, and 66 are located on a carrier plate 68, wherein the sensing surfaces of the light sensing units face outward. Further, the light sensing units 63, 64, 65, and 66 are electrically connected to the operating module 13. In an embodiment, the light sensing units 63, 64, 65, and 66 may be adjacent to each periphery or edges of the carrier plate 68. The light sensing units 63, 64, 65, and 66 are mounted on the shell 61. In an embodiment, sensing surfaces of the light sensing units 63, 64, 65, and 66 are the same as or similar to a horizontal surface of the carrier plate 68. The number of the light sensing units is not limited to this embodiment.

Figure 6:
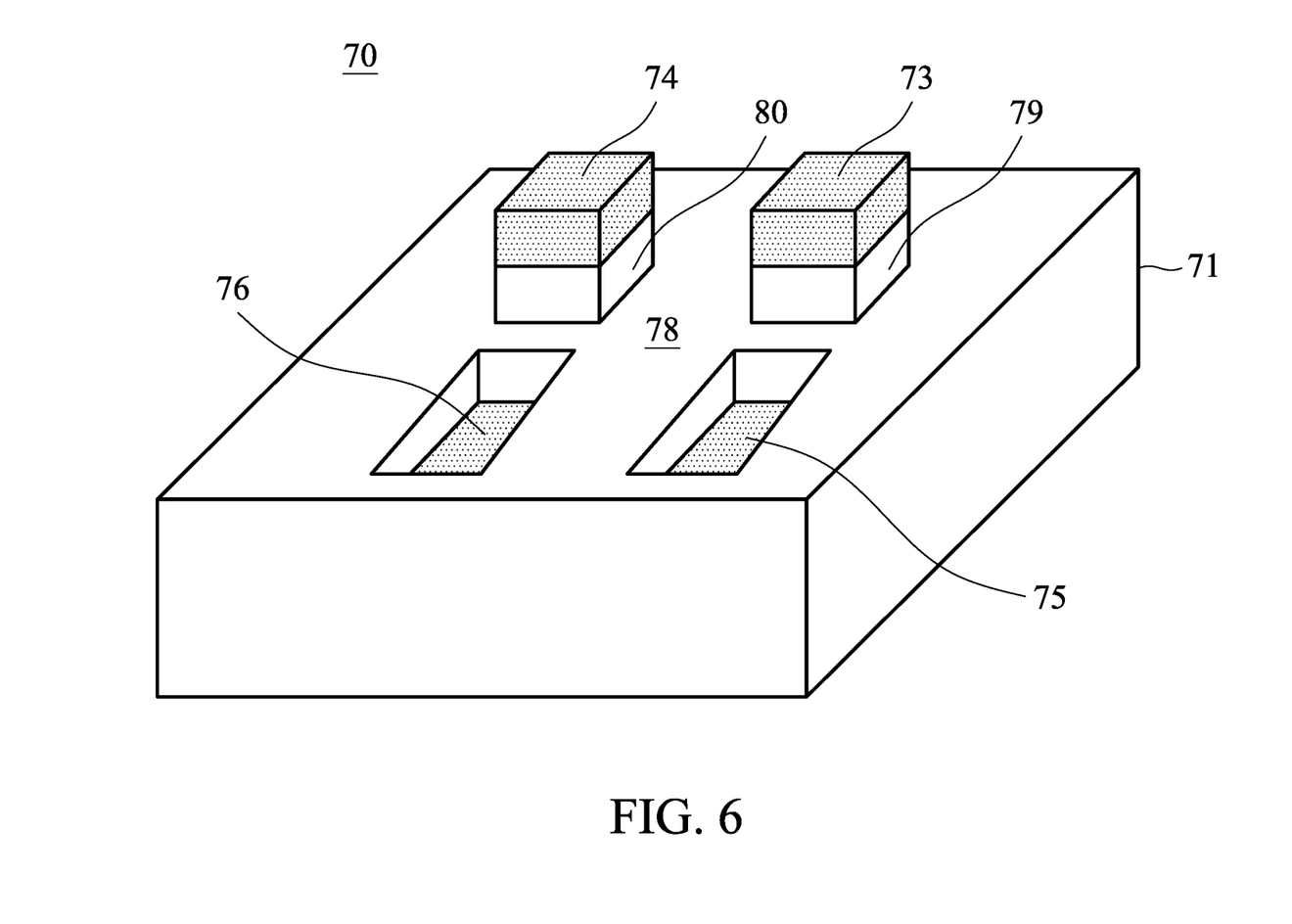
FIG. 6 is an enlarged diagram of a sensing module in accordance with an embodiment of the present disclosure.

FIG. 6 is an enlarged diagram of a sensing module 70 in accordance with an embodiment of the present disclosure. The sensing module 70 includes a shell 71 and light sensing units 73, 74, 75, and 76. Sensing surfaces of the light sensing units 73, 74, 75, and 76 face outward. Further, the light sensing units 73, 74, 75, and 76 are electrically connected to the operating module 13. In an embodiment, heights of the sensing surfaces of the light sensing units 73 and 74 are higher than a height of a carrier plate 78 of the shell 71. In addition, the sensing surfaces of the light sensing units 73 and 74 are parallel to the carrier plate 78. Bumps 79 and 80 are protruding from the shell 71 and located on the carrier plate 78. Since the bumps 79 and 80 are located respectively under the light sensing units 73 and 74, the sensing surfaces of the light sensing units 73 and 74 are elevated. Additionally, the height of the bump 79 is different from that of the bump 80. Further, heights of the sensing surfaces of the light sensing units 75 and 76 are lower than the height of the carrier plate 78. In addition, the sensing surfaces of the light sensing units 75 and 76 are parallel to the carrier plate 78. Specifically, the light sensing units 75 and 76 are respectively located in cavities of the shell 71, wherein the cavities have different depths. Numbers of the light sensing units, heights, and depths are not limited to this embodiment.

Figure 7:
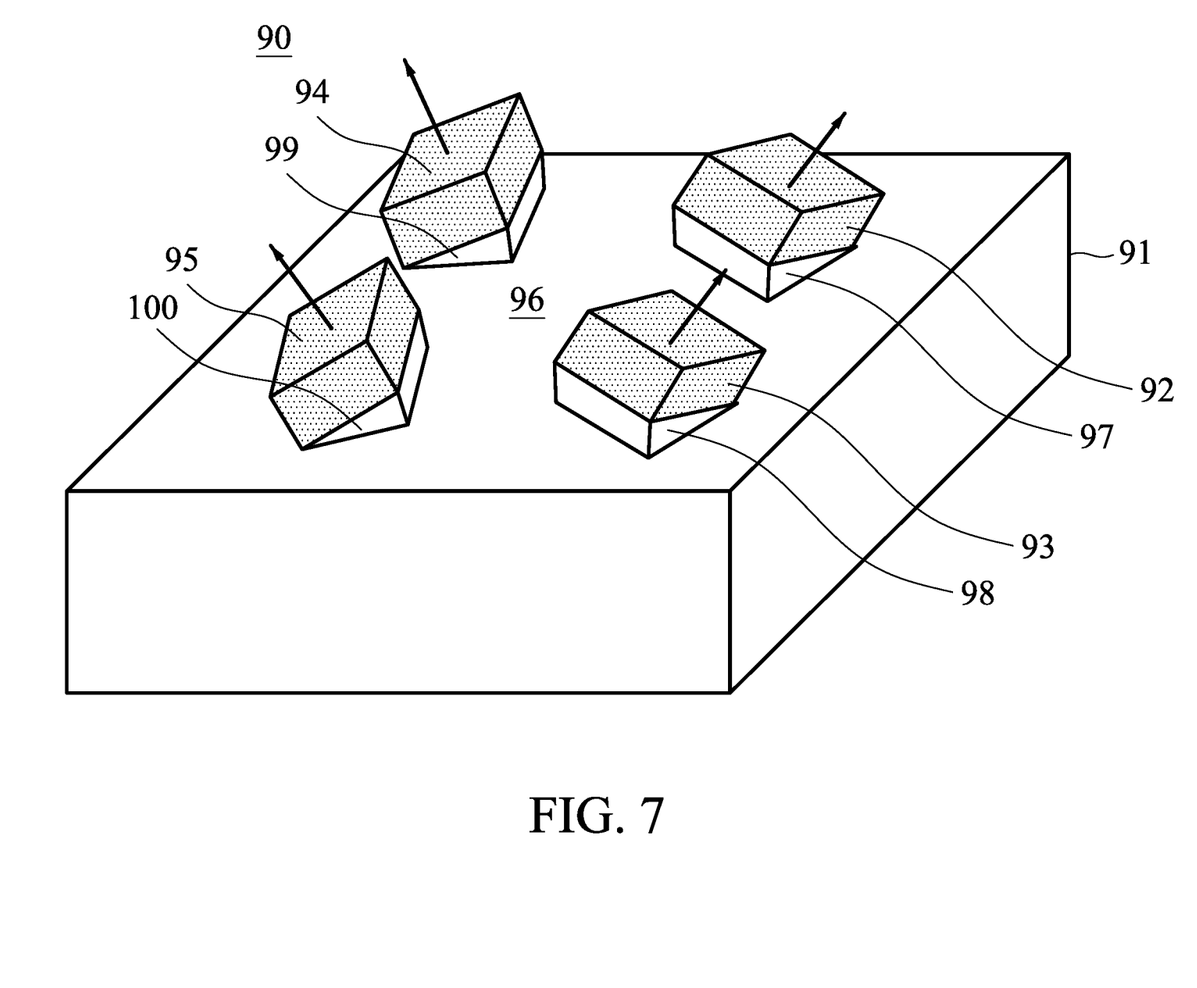
FIG. 7 is an enlarged diagram of a sensing module in accordance with an embodiment of the present disclosure.

FIG. 7 is an enlarged diagram of a sensing module 90 in accordance with an embodiment of the present disclosure. The sensing module 90 includes a shell 91 and light sensing units 93, 94, 95, and 96. Sensing surfaces of the light sensing units 93, 94, 95, and 96 face outward. Further, the light sensing units 93, 94, 95, and 96 are electrically connected to the operating module 13. In an embodiment, sensing surfaces of the light sensing units 93, 94, 95, and 96 may be arranged as inclined surfaces, which are different from a carrier plate 96 of the shell 91. Bumps 97, 98, 99 and 100 are protruding from the shell 91 and located on the carrier plate 96. Since the bumps 97, 98, 99 and 100 are located respectively under the light sensing units 93, 94, 95, and 96, the sensing surfaces of the light sensing units 93, 94, 95, and 96 are elevated. Additionally, incline levels of top surfaces of the bumps 93, 94, 95, and 96 are different from each other. Hence, the sensing surfaces of the light sensing units 93, 94, 95, and 96 have different normal vectors, wherein the normal vectors are also different from the normal vector of the carrier plate 96. In other words, the sensing surfaces of the light sensing units 93, 94, 95, and 96 face toward various directions. Inclination of each of light sensing units 93, 94, 95, and 96 may be recorded in advance in the operating module 13. So that, the inclination may increase diversity of motions of the robot arm 11 when operating the sensing module 90. Numbers of the light sensing units, heights, and depths are not limited to this embodiment.

Figure 8:
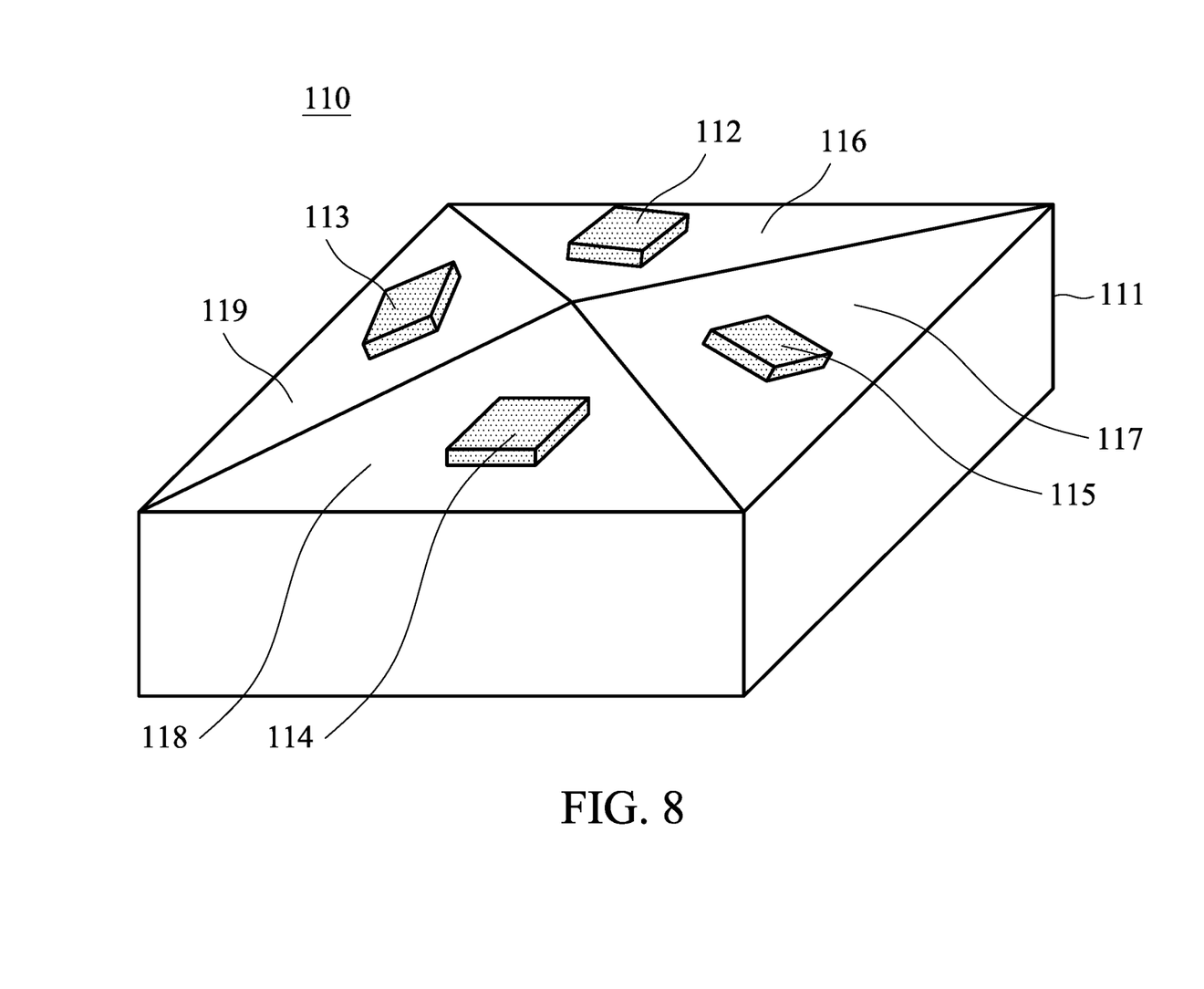
FIG. 8 is an enlarged diagram of a sensing module in accordance with an embodiment of the present disclosure.

FIG. 8 is an enlarged diagram of a sensing module 110 in accordance with an embodiment of the present disclosure. The sensing module 110 includes a shell 111 and light sensing units 112, 113, 114, and 115. Sensing surfaces of the light sensing units 112, 113, 114, and 115 face outward. Further, the light sensing units 112, 113, 114, and 115 are electrically connected to the operating module 13. In an embodiment, the shell 111 includes four inclined carrier plates 116, 117, 118, and 119. The light sensing units 112, 113, 114, and 115 are respectively located on the inclined carrier plates 116, 117, 118, and 119. Each of the inclined carrier plates 116, 117, 118, and 119 has different inclinations and normal vectors. Thus, the sensing surfaces of the light sensing units 112, 113, 114, and 115 have different normal vectors. In other words, the sensing surfaces of the light sensing units 112, 113, 114, and 115 face toward various directions. Inclination of each of inclined carrier plates 116, 117, 118, and 119 may be recorded in advance in the operating module 13. So that, the inclination may increase diversity of motions of the robot arm 11 when operating the sensing module 110. Numbers of the light sensing units, heights, and depths are not limited to this embodiment.

The aforementioned light sensing units having different positions, heights, depths, inclinations, angles, and numbers will cause diversity of motions of the robot arm 11 when projecting light beams. Hence, status of motions of the robot arm 11 may be increased to catch more pairs of motion commands and image data. By using a numerical method, the operating module 13 adjusts kinematic parameters so that deviations are minimized and approached to zero. It is efficient to improve the precision of the robot arm 11 after calibration.

Figure 9:
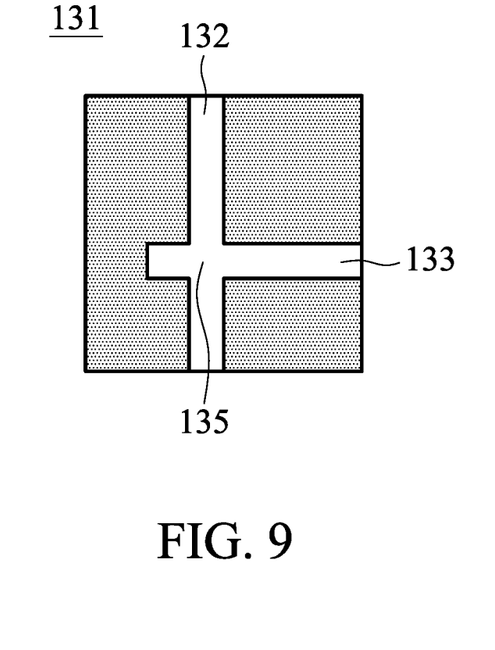
FIG. 9 is a projected image after installation of an optical mask in accordance with an embodiment of the present disclosure.

FIG. 9 is a projected image after installation of an optical mask in accordance with an embodiment of the present disclosure. In an embodiment, before calibration, an optical mask is located on an emit end of the light emitter 31. The light emitter 31 is implemented by a laser unit or a light emitting diode. A light beam from the light emitter 31 penetrates through the optical mask. This causes physic characteristics such as interference, diffraction, shadowing and so on, therefore, the light beam is transformed into a projection of two-dimensional characteristic pattern or geometric pattern. The optical mask may be an optical component generating a cross-pattern projection 131, as shown in FIG. 9. A strip 132 intersects to a strip 133, wherein an intersection 135 maybe not at the center of the strips 132 or 133. Hence, the cross-pattern projection 131 became an asymmetric cross. It is efficient to improve characteristic of projected images. The cross-pattern projection 131 thus may provide a characteristic pattern for recognizing positions to improve the precision of the sensing modules in the present disclosure. For example, the operating module 13 may catch the intersection 135, corners, or ends of the strips 132 and 133 as a reference point for image data and motion commands. So that, the operating module 13 may clearly positioning reference positions of the cross-pattern projection 131 to obtain an accurate image data.

Figure 10:
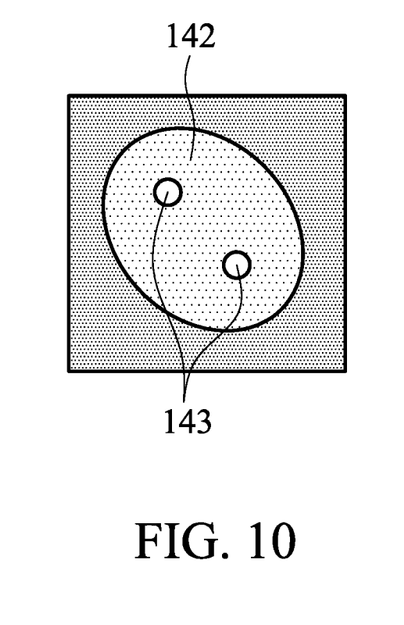
FIG. 10 is a projected image after installation of an optical mask in accordance with an embodiment of the present disclosure.

FIG. 10 is a projected image after installation of an optical mask in accordance with an embodiment of the present disclosure. In an embodiment, before calibration, an optical mask is located on an emit end of the light emitter 31. The light emitter 31 is implemented by a laser unit or a light emitting diode. A light beam from the light emitter 31 penetrates through the optical mask. This causes physic characteristics such as interference, diffraction, shadowing and so on, therefore, the light beam is transformed into a projection of two-dimensional characteristic pattern or geometric pattern. The optical mask may be an optical component generating an ellipse-pattern projection 142 as shown in FIG. 10. The ellipse-pattern projection 142 may provide a characteristic pattern for recognizing positions to improve the precision of the sensing modules in the present disclosure. For example, the operating module 13 may catch focal points 143 of the ellipse-pattern projection 142 as reference points for image data and motion commands. So that, the operating module 13 may clearly positioning reference positions of the ellipse-pattern projection 142 to obtain an accurate image data.

Figure 11:
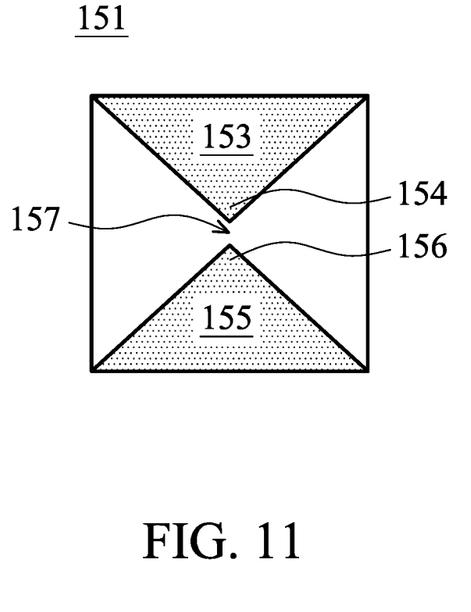
FIG. 11 is a projected image after installation of an optical mask in accordance with an embodiment of the present disclosure.

FIG. 11 is a projected image after installation of an optical mask in accordance with an embodiment of the present disclosure. In an embodiment, before calibration, an optical mask is located on an emit end of the light emitter 31. The light emitter 31 is implemented by a laser unit or a light emitting diode. A light beam from the light emitter 31 penetrates through the optical mask. This causes physic characteristics such as interference, diffraction, shadowing and so on, therefore, the light beam is transformed into a projection of two-dimensional characteristic pattern or geometric pattern. The optical mask may be an optical component generating a two-opposing-triangle-pattern projection 151 as shown in FIG. 11. An angle 154 of a triangle 153 is aligned to an angle 156 of a triangle 155. There is a gap 157 between the angle 154 and the angle 156. The two-opposing-triangle-pattern projection 151 may provide a characteristic pattern for recognizing positions to improve the precision of the sensing modules in the present disclosure. For example, the operating module 13 may catch the gap 157 or angles 154 and 156 of the two-opposing-triangle-pattern projection 151 as reference patterns for image data and motion commands. So that, the operating module 13 may clearly positioning reference positions of the two-opposing-triangle-pattern projection 151 to obtain an accurate image data.

Therefore, the present disclosure may provide a calibration equipment and a calibration method of a mechanical system such as a robot arm. Before shipment of the mechanical system such as the robot arms, the calibration equipment may compensate the deviation of precision, which is caused by such as manufacturing or assembly errors. In addition, the calibration equipment allows users to calibrate robot arms regularly in the factory. The calibration equipment may compensate shifting of the precision and maintain the mechanical system such as the robot arms to work at an accuracy precision. The shifting of precision may be caused by such as mechanical fatigue after a long-term production or assembly errors after repairing such as replacement of a motor. So that, the disclosed calibration equipment may make sure that the precision of the mechanical system such as the robot arms ranges in a reasonable interval. Additionally, the disclosed calibration equipment is also applicable to monitor a drift of the precision of the mechanical system such as the robot arm 11 in production lines. The disclosed calibration equipment also provides manufactures with checking and alerting the precision of the robot arms in production lines. It is efficient to improve reliability of the production. Furthermore, the disclosed calibration equipment may reduce expensive costs of general calibration instruments.

In an embodiment, the plurality of light sensing units are arranged as an array.

In an embodiment, the plurality of light sensing unit are adjacent to a plurality of edges of the carrier plate, respectively.

In an embodiment, the plurality of light sensing unit are at a plurality of corners of the carrier plate, respectively.

In an embodiment, at least one of the plurality of light sensing unit has at least one height of at least one sensing surface, and the at least one height is lower than a height of the carrier plate.

In an embodiment, at least one of the plurality of light sensing unit has at least one height of at least one sensing surface, and the at least one height is higher than a height of the carrier plate.

In an embodiment, at least one of the plurality of light sensing unit has at least one sensing surface, and the at least one sensing surface is at least one inclined surface different from the carrier plate.

In an embodiment, the carrier plate further includes at least one inclined plane different from a horizontal plane.

In an embodiment, each of the plurality of light sensing unit is a two-dimensional image sensor.

In an embodiment, the light emitter is a laser unit or a light emitting diode.

In an embodiment, the calibration equipment further includes an optical mask disposed on an emit end of the light emitter.

In an embodiment, the optical mask is an optical component generating a two-opposing-triangle-pattern projection.

In an embodiment, the optical mask is an optical component generating a cross-pattern projection.

In an embodiment, the optical mask is an optical component generating an ellipse-pattern projection.

In an embodiment, the optical mask is an optical component generating a two-opposing-triangle-pattern projection.

In an embodiment, the operating module receives a plurality of motion commands.

In an embodiment, the operating module calculates a plurality of deviations between the plurality of image data and the plurality of motion commands.

In an embodiment, the calibrating method further includes: calculating the calibrated kinematic parameter by a numerical method, wherein the calibrated kinematic parameter reduces the plurality of deviations.

In an embodiment, the calibrating method further includes: setting a predetermined threshold of a precision; and monitoring whether or not the plurality of deviations exceed the predetermined threshold of the precision.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A calibration equipment of a mechanical system, the calibration equipment comprising:
    a light emitter, configured to emit a light beam;
    a light sensing module, further comprising a carrier plate and a plurality of light sensing units located on the carrier plate, wherein the plurality of light sensing units receive the light beam and generate a plurality of image data;
    an operating processor, configured to receive and process the plurality of image data and generate a plurality of calibrated kinematic parameters; and
    a controller, configured to modify a plurality of motion commands according to the calibrated kinematic parameters transmitted via the operating processor, so as to simultaneously minimizing a plurality of deviations between the image data and the corresponding motion commands;
    wherein the calibrated kinematic parameters include:
        a calibrated emitter parameter, denoting a three-dimensional position and a direction of the light emitter;
        a calibrated robot parameter, denoting a six-dimensional space conversion parameter of a robot arm; and
        a calibrated sensor-robot parameter, denoting a six-dimensional space conversion parameter between the robot arm and the light sensing module.

2. The calibration equipment of claim 1, wherein the plurality of light sensing units are arranged as an array.

3. The calibration equipment of claim 1, wherein the plurality of light sensing unit are adjacent to a plurality of edges of the carrier plate respectively.

4. The calibration equipment of claim 1, wherein the plurality of light sensing unit are at a plurality of corners of the carrier plate respectively.

5. The calibration equipment of claim 1, wherein at least one of the plurality of light sensing units has at least one height of at least one sensing surface, and the at least one height is lower than a height of the carrier plate.

6. The calibration equipment of claim 1, wherein at least one of the plurality of light sensing units has at least one height of at least one sensing surface, and the at least one height is higher than a height of the carrier plate.

7. The calibration equipment of claim 1, wherein at least one of the plurality of light sensing unit has at least one sensing surface, and the at least one sensing surface is at least one inclined surface different from the carrier plate.

8. The calibration equipment of claim 1, wherein the carrier plate further comprises at least one inclined plane different from a horizontal plane.

9. The calibration equipment of claim 1, wherein each of the plurality of light sensing unit is a two-dimensional image sensor.

10. The calibration equipment of claim 1, wherein the light emitter is a laser unit or a light emitting diode.

11. The calibration equipment of claim 1, further comprising:
    an optical mask disposed on an emit end of the light emitter.

12. The calibration equipment of claim 11, wherein the optical mask is an optical component generating a geometric-pattern projection.

13. The calibration equipment of claim 11, wherein the optical mask is an optical component generating a cross-pattern projection.

14. The calibration equipment of claim 11, wherein the optical mask is an optical component generating an ellipse-pattern projection.

15. The calibration equipment of claim 11, wherein the optical mask is an optical component generating a two-opposing-triangle-pattern projection.

16. The calibration equipment of claim 1, wherein the operating processor receives the plurality of motion commands.

17. The calibration equipment of claim 16, wherein the operating processor calculates the plurality of deviations between the plurality of image data and the plurality of motion commands.

* * * * *